(12) United States Patent
Chang

(10) Patent No.: US 6,458,402 B1
(45) Date of Patent: *Oct. 1, 2002

(54) PROCESS FOR MAKING MILKSHAKE BEVERAGE COMPOSITIONS HAVING IMPROVED CONSISTENCY, FLAVOR AND PHYSICAL STABILITY

(75) Inventor: Pei K. Chang, Cortlandt Manor, NY (US)

(73) Assignee: PepsiCo, Inc., Purchase, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,549

(22) Filed: Apr. 4, 1997

(51) Int. Cl.⁷ .................................................. A23B 4/03
(52) U.S. Cl. ....................... 426/569; 426/519; 426/522; 426/584; 426/590; 426/407; 426/661
(58) Field of Search ................................ 426/565, 569, 426/521, 522, 519, 590, 584, 399, 407, 661

(56) References Cited

U.S. PATENT DOCUMENTS

| | | | | |
|---|---|---|---|---|
| 3,385,714 A | * | 5/1968 | Smith | 99/171 |
| 3,622,354 A | * | 11/1971 | Diamond et al. | 99/189 |
| 3,628,969 A | * | 12/1971 | Vilim et al. | 99/139 |
| 3,666,497 A | * | 5/1972 | Stewart, Jr. et al. | 99/212 |
| 3,800,036 A | * | 3/1974 | Gabby et al. | 426/164 |
| 3,843,805 A | * | 10/1974 | Powell | 426/163 |
| 3,876,794 A | * | 4/1975 | Rennhard | 426/152 |
| 3,914,440 A | * | 10/1975 | Witzig | 426/130 |
| 3,949,104 A | * | 4/1976 | Cheng et al. | 426/578 |
| 3,969,534 A | | 7/1976 | Pavey et al. | 426/34 |
| 4,156,020 A | * | 5/1979 | Bohrmann et al. | 426/96 |
| 4,219,583 A | * | 8/1980 | Igoe | 426/580 |
| 4,242,367 A | * | 12/1980 | Igoe | 426/573 |
| 4,281,111 A | * | 7/1981 | Hunt et al. | 536/111 |
| 4,282,262 A | * | 8/1981 | Blake | 426/565 |
| 4,291,085 A | * | 9/1981 | Ito et al. | 428/215 |
| 4,308,294 A | | 12/1981 | Rispoli et al. | 426/564 |
| 4,312,891 A | | 1/1982 | Eisfeldt | 426/573 |
| 4,369,196 A | | 1/1983 | Sukegawa | 426/104 |
| 4,421,778 A | * | 12/1983 | Kahn et al. | 426/564 |
| 4,434,186 A | * | 2/1984 | Desia et al. | 426/565 |
| 4,497,841 A | * | 2/1985 | Wudel et al. | 426/565 |
| 4,542,035 A | * | 9/1985 | Huang et al. | 426/565 |
| 4,552,774 A | | 11/1985 | Gronfor | 426/582 |
| 4,568,555 A | | 2/1986 | Spanier | 426/582 |
| 4,609,554 A | | 9/1986 | Barua et al. | 426/43 |
| 4,609,561 A | * | 9/1986 | Wade et al. | 426/565 |
| 4,623,552 A | | 11/1986 | Rapp | 426/575 |
| 4,689,239 A | | 8/1987 | Rispoli et al. | 426/578 |
| 4,692,340 A | | 9/1987 | Gütte et al. | 426/72 |
| 4,748,026 A | | 5/1988 | Keefer et al. | 426/43 |
| 4,788,075 A | | 11/1988 | Joseph et al. | 426/579 |
| 4,817,396 A | * | 4/1989 | Menzel | 366/102 |
| 4,837,035 A | | 6/1989 | Baker et al. | 426/43 |
| 4,837,036 A | | 6/1989 | Baker et al. | 426/43 |
| 4,851,250 A | * | 7/1989 | Bronnert | 426/511 |
| 4,853,243 A | * | 8/1989 | Kahn et al. | 426/564 |
| 4,855,155 A | | 8/1989 | Cavallin | 426/564 |
| 4,869,916 A | | 9/1989 | Clark et al. | 426/573 |
| 4,921,717 A | | 5/1990 | Ranjith | 426/587 |
| 4,931,302 A | | 6/1990 | Leshik et al. | 426/548 |
| 4,956,186 A | | 9/1990 | Streiff et al. | 426/43 |
| 4,963,384 A | | 10/1990 | Heine et al. | 426/580 |
| 4,988,529 A | | 1/1991 | Nakaya et al. | 426/569 |
| 5,006,359 A | * | 4/1991 | Senda | 426/565 |
| 5,066,508 A | * | 11/1991 | Schuppiser et al. | 426/584 |
| 5,079,024 A | | 1/1992 | Crane | 426/573 |
| 5,084,295 A | * | 1/1992 | Whelan et al. | 426/565 |
| 5,175,013 A | * | 12/1992 | Huang et al. | 426/565 |
| 5,202,145 A | * | 4/1993 | Wisler et al. | 426/580 |
| 5,232,726 A | * | 8/1993 | Clark et al. | 426/519 |
| 5,250,316 A | | 10/1993 | Harris | 426/573 |
| 5,252,352 A | | 10/1993 | Banach et al. | 426/580 |
| 5,304,387 A | | 4/1994 | Hine | 426/582 |
| 5,342,636 A | * | 8/1994 | Bakshi et al. | 426/302 |
| H1395 H | * | 1/1995 | Prosser | 426/633 |
| 5,393,549 A | | 2/1995 | Badertscher et al. | 426/564 |
| 5,403,611 A | | 4/1995 | Tomita et al. | 426/565 |
| 5,429,837 A | | 7/1995 | Balabaud et al. | 426/521 |
| 5,486,372 A | | 1/1996 | Martin et al. | 426/565 |
| 5,490,997 A | * | 2/1996 | Devine et al. | 426/573 |
| 5,517,804 A | * | 5/1996 | Lynch | 426/115 |

\* cited by examiner

*Primary Examiner*—Nina Bhat
(74) *Attorney, Agent, or Firm*—Fitzpatrick, Cella, Harper & Scinto

(57) ABSTRACT

The invention is directed to a process of making milkshake beverage compositions having improved consistency, flavor and physical stability, which process involves eliminating or modifying the pasteurization step used or reversing the sequence of pasteurization and homogenization in conventional methods of manufacturing milkshake beverage compositions so as to limit the swelling of any starch granules present and thus avoid the detrimental effects that the shearing forces found in homogenization processes have on such swollen starch granules.

25 Claims, No Drawings

PROCESS FOR MAKING MILKSHAKE BEVERAGE COMPOSITIONS HAVING IMPROVED CONSISTENCY, FLAVOR AND PHYSICAL STABILITY

BACKGROUND OF THE INVENTION

1. Field of the Invention

The present invention relates generally to milkshake beverage compositions having improved consistency, flavor and physical stability. More particularly, the present invention relates to improved processes of making milkshake beverage compositions involving the elimination or modification of the pasteurization step typically employed in processes for producing such compositions.

2. Description of the Related Art

Milkshake beverages are becoming increasingly popular. Conventional processes for producing shelf-stable milkshake beverage compositions involve the steps of creating a batch made up of the various compositional components, which typically includes modified food starch; subjecting the batch to high temperature short time ("HTST") pasteurization, or the like; homogenizing the resulting pasteurized composition; filling the homogenized, pasteurized composition into the requisite containers; and subjecting the filled containers to a retorting treatment. The quality of milkshake beverage compositions prepared by such conventional processes is highly dependent on processing conditions. Indeed, a particular product may vary in consistency with respect to mouthfeel and physical stability depending on how the product is made, even though all of the ingredients in the product and their relative proportions stay unchanged.

Various techniques have been attempted in the past to overcome such inconsistencies. For example, a tight control on raw ingredient specifications (e.g., starch, NFDM) and maintaining the same retorting conditions have been tried. These attempts, however, have failed to eliminate such inconsistencies.

SUMMARY OF THE INVENTION

Due to the increasing popularity of milkshake beverage compositions, there is a need in the art for processes which overcome the inconsistencies in mouthfeel and stability present in products manufactured by conventional processes. The present invention meets this need by identifying that these inconsistencies stem in great part from the shearing effects that homogenization, a necessary step in the preparation of milkshake beverages, has on swollen starch granules.

It has been discovered that the pasteurization step employed in conventional processes swells starch granules and that the back pressure and shear effect of the subsequent homogenization treatment fragments these swollen starch granules, thus negatively affecting the consistency of the end product. To avoid or minimize such negative fragmentation effects, the present invention provides for:

(1) reversing the sequence of the pasteurization and homogenization steps used in conventional processes for producing milkshake beverage compositions, so that homogenization precedes pasteurization, thus avoiding the shear effect that homogenization has on swollen starch granules;

(2) lowering the temperature used in the pasteurization step typically employed to make milkshake beverages, thus limiting the degree of swelling of the starch granules present; or (3) omitting the pasteurization step totally, thus eliminating any swelling of the starch granules.

The present invention additionally provides for using the three alternatives outlined above both in HTST pasteurization processes and in ultra-high temperature processes used for aseptic packaging ("UHT processes"). In the case of UHT processes, the first alternative outlined above is preferable. The present invention also provides for beverage compositions produced by such HTST and UHT processes.

Additional aspects and advantages of the present invention are set forth in part in, or will be apparent from, the detailed description of exemplary embodiments which follow, or may be learned through routine practice of the invention.

DETAILED DESCRIPTION OF THE INVENTION

Homogenization is an essential step for providing stability to milkshake beverage compositions. It has been discovered, however, that homogenization imposes shearing effects on swollen starch granules which detrimentally affect product consistency with respect to viscosity and physical stability. Consequently, to avoid such inconsistencies, it is necessary to eliminate or minimize the number of swollen starch granules present during homogenization. The present invention provides three methods for doing so.

In accordance with one embodiment of the present invention, the pasteurization and homogenization steps employed in conventional processes for producing milkshake beverage compositions are carried out in reverse sequence so that pasteurization follows homogenization. By doing so, only unswollen starch granules are present during homogenization. It has been found that shear force has no effect on non-swollen starch granules.

In this "reverse sequence" embodiment, a milkshake beverage composition having a pH of from about 6.5 to about 7.0, a viscosity of from about 30 to about 600 centipoise, and a non-fat milk solids content of from about 4.5% to about 10.0% by weight, which is equivalent to a liquid milk content of greater than 50% by weight, is obtained by:

(a) preparing a milkshake batch mixture comprising a milk component and a starch component;

(b) homogenizing the mixture at a pressure of from about 2,000 to about 5,000 psi to form an homogenized mixture; and (c) pasteurizing the homogenized mixture to form a milkshake beverage composition.

The resulting milkshake beverage composition can be filled into appropriate containers, such as retortable glass bottles or cans, which then undergo retorting treatments.

As noted, homogenization step (b) is carried out under a total pressure of from about 2,000 to about 5,000 psi, with a total pressure of from about 3,000 to about 4,500 psi being more preferred. The use of pressures lower than 2,000 psi may result in undesirable instability, whereas the use of pressures higher than 5,000 psi may be impractical. The use of an homogenization pressure of at least 3,000 psi is preferred to ensure that the final milkshake beverage composition possesses uniformity.

As long as the pressure requirements noted above are satisfied, any conventional homogenization apparatus or technique can be employed in preparing the milkshake beverage compositions of the present invention. In carrying out homogenization step (b), however, it is preferable to use temperatures ranging from about 100° F. to about 130° F., with temperatures of from about 110° F. to about 120° F. more preferred. The use of temperatures lower than 100° F. may not adequately homogenize the cream, whereas the use of temperatures higher than 130° F. might swell the starch granules. The use of the preferred temperatures of from about 110° F. to about 120° F. helps to ensure that the final milkshake beverage composition possesses consistent viscosity.

Pasteurization step (c) of the reverse sequence embodiment described above may be carried out using any of the apparatus or methods conventional in the art. For example, plate-in-frame HTST pasturization may be employed. The temperature used in pasteurization step (c) is preferably from about 160° F. to about 180° F., and more preferably from about 165° F. to about 175° F. Using temperatures lower than 160° F. may inadequately swell the starch granules, whereas using temperatures higher than 180° F. might affect the flavor of the final product. By using temperatures of from about 165° F. to about 175° F., it is ensured that the final milkshake beverage composition possesses uniformity.

The preferable pressure range for pasteurization step (c) in the reverse sequence process is from about 2,000 to about 5,000 psi, with a pressure of from about 3,000 to about 4,500 being more preferred. The use of pasteurization pressures lower than 2,000 psi may result in undesirable stability, whereas the use of pasteurization pressures higher than 5,000 psi may be impractical. Pasteurization pressures of at least 3,000 psi are preferred to ensure that the final milkshake beverage composition possesses uniformity.

According to a second embodiment of the invention, the conventional method of employing pasteurization followed by homogenization is used to produce the milkshake beverage compositions of the invention. However, the temperature used during pasteurization is lowered to a level sufficient to limit the swelling of any starch granules present. Thus, the starch granules present during the subsequent homogenization are substantially unswollen and consequently will not be detrimentally affected by the shearing forces present during homogenization.

In general, starch granules, especially modified food starch granules, are fully cooked and swollen after only a few minutes at 160° F. Given that conventional HTST processes operate at 185° F. for 30 seconds, it is necessary to lower the temperature during HTST pasteurization to from about 110° F. to about 140° F. to avoid any appreciable swelling of the starch granules.

In this "low-temperature pasteurization" embodiment, a milkshake beverage composition having a pH of from about 6.5 to about 7.0, a viscosity of from about 30 to about 600 centipoise, and a non-fat milk solids content of from about 4.5% to about 10.0% by weight, which is equivalent to a liquid milk content of greater than 50% by weight, is obtained by:

(a) preparing a milkshake batch mixture comprising a milk component and a starch component having a diameter of from about 5 to about 30 microns with an average diameter of from about 10 to about 20 microns, and more preferably of about 15 microns;

(b) subjecting the mixture to a pasteurization treatment conducted at a temperature of from about 120° F. to about 145° F.; and (c) homogenizing the pasteurized mixture of step (b) at a pressure of from about 2,000 to about 5,000 psi to form a homogenized mixture.

As noted, the pasteurization step (b) of the low-temperature pasteurization process is carried out in a temperature range of from about 120° F. to about 145° F. More preferably, pasteurization step (b) is carried out a temperature of from about 120° F. to about 130° F. The most preferred temperature will vary depending on the particular starch component employed and other processing conditions, such as the temperature of the blending water used for batching and the holding time after batching and prior to homogenization.

Pasteurization step (b) may be carried out using any of the apparatus or methods conventional in the art, such as plate-in-frame HTST pasteurization, so long as the low temperature identified is maintained. The preferred pressure range for pasteurization step (b) in the low-temperature pasteurization process is from about 2,000 to about 5,000 psi, with a pressure of from about 3,000 to about 4,500 psi being more preferred. By employing such pasteurization pressures, it is possible to avoid the instability resulting at pressures lower than 2,000 psi, and it may be impractical to conduct pasteurization at pressures higher than 5,000 psi. A pressure of at least 3,000 psi is preferred to ensure that the final milkshake beverage composition is uniform.

Homogenization step (c) in the low-temperature pasteurization embodiment of the present invention may be carried out by any of the apparatus or methods conventional in the art. The homogenization temperature and pressure ranges identified for the reverse sequence process are equally applicable in the low-temperature pasteurization embodiment of the invention. However, because under some circumstances there will be minor swelling of the starch component during the low-temperature pasteurization step (b), it may sometimes be desirable to use lower pressures in the range of from about 2,500 to about 3,500 psi during homogenization step (c) in order to minimize the shearing effects on such partially swollen starch granules.

In accordance with the third embodiment of the invention, the pasteurization step is omitted completely, thus precluding any swelling of the starch granules prior to homogenization. The retorting treatment carried out after the milkshake beverage composition has been filled into appropriate containers is sufficient to sterilize the composition. In addition, because the HTST pasteurization step is not believed to be essential to providing any significant effect on finished product micro-stability, improved product qualities such as cleaner flavor and brighter color can be achieved when the HTST pasteurization step is omitted completely. Thus, it is not critical that the milkshake beverage composition undergo a pasteurization treatment prior to being filled into the serving-size containers prior to retorting.

In this "pasteurization-free" embodiment, a milkshake beverage composition having a pH of from about 6.5 to about 7.0, a viscosity of from about 30 to about 600 centipoise, a non-fat milk solids content of from about 4.5% to about 10.0% by weight, which is equivalent to a liquid milk content of greater than 50% by weight, is obtained by:

(a) preparing a milkshake batch mixture comprising a milk component and a starch component; and (b) homogenizing the mixture at a pressure of from about 2,000 to about 5,000 psi to form a homogenized mixture;

wherein, prior to undergoing homogenization step (b), the granules of the starch component possess a diameter of from about 5 to about 30 microns, preferably with an average diameter of from about 10 to about 20 microns, and more preferably with an average diameter of about 15 microns.

Homogenization step (b) in the pasteurization-free embodiment of the present invention may be carried out by any of the apparatus or methods conventional in the art. In addition, the homogenization temperature and pressure ranges identified for the reverse sequence process are applicable in the pasteurization-free embodiment of the invention.

Although all three of the embodiments discussed above provide compositions having improved viscosity, flavor and physical stability, the reverse sequence embodiment involving pasteurization following homogenization is preferred. The other two methods possess a possible negative side effect, depending on other processing conditions, that unswollen starch granules might settle down without agitation during the holding period prior to filling products into bottles for retorting. Once the bottles are filled, these unswollen starch granules might settle out and create a layer of starch in the bottom of the bottle. This possible starch settling, however, is simply a logistical issue that can be remedied by adequate mixing inside the containers during the rotational cycle at the beginning of retorting prior to heat treatment. Processing steps such as HTST pasteurization, homogenization and retorting affect product consistency not only due to the individual ingredients, such as starch, NFDM and carrageenan, but also due to possible interactions among them as well.

Retort conditions will typically be required to generate a viscosity difference for products obtained by all three of the process sequences discussed above. The retort process used may be any of those conventional in the art. For example, a PRG-900 Stock batch agitating retort process may be employed. In this process, each sterilization cycle includes come-up-time, sterilization and cooling steps. Each step in the cycle is controlled through software programming, with all parameters adjustable. The set-up is a full water immersion process, and agitation is an end-over-end rotation within the process vessel. The length of the cycle will change with the product type. This retort process is capable of sterilizing cans, glass or plastic containers. Other protocols such as incubation may also be useful to insure product microstability.

As discussed, the present invention is equally applicable to UHT processes used in aseptic packaging. Indeed, aseptic UHT conditions typically must be employed to generate a viscosity difference between products obtained by the reverse sequence process. Any conventional UHT process for aseptic packaging, such as a liquified clean mixer, may be used. For example, a Sterilab 300 PDT tubular heat exchanger, sold by Tetra-Pak, may be used to obtain a process temperature of 280–284° F. for an average hold time of 60 seconds, yielding an $F_o$ value of 21. The product can then be aseptically homogenized at a temperature of 170° F., at a pressure of 2,500 psi in the first stage and 500 psi in the second stage. A TBA/9 aseptic filler may then be used to pack the product into 250 ml brik paks.

The milkshake beverage compositions produced by the three methods discussed above preferably possess a pH of from about 6.5 to about 7.0, more preferably from about 6.6 to about 6.9, and even more preferably of about 6.7. At a pH lower than about 6.5, the composition will be unstable. On the other hand, the composition is likely to become discolored at a pH greater than about 7.0. It is noted that the pH of the milkshake beverage compositions of the present invention is likely to go down by approximately 0.3 during the retorting or aseptic packaging treatments. Therefore, it is often beneficial to adjust the pH of the milkshake mixture up to 7.3 prior to restort or UHT treatment.

Moreover, the milkshake beverage compositions according to the present invention preferably possess a viscosity of from about 30 to about 600 centipoise, with a viscosity of from about 50 to about 300 centipoise more preferred, and viscosity of from about 150 to about 200 centipoise even more preferred. Viscosities lower than 30 centipoise should be avoided because such product lacks the consistency of a milkshake beverage. On the other hand, viscosities higher than 600 centipoise also should be avoided because the very heavy texture renders the beverage difficult to drink. The primary contributors to finished product viscosity are believed to be the non-fat milk solids, the stabilizer and the modified food starch thickener. By varying any one or more of these three ingredients, the viscosity of the beverage product can be changed. However, starch has the greatest effect on viscosity.

The compositions produced according to the processes of the present invention preferably contain a non-fat milk solids content of from about 4.5% to about 10.0% by weight, more preferably of from about 6.0% to about 8.5% by weight, and even more preferably of from about 6.5% to about 8.0% by weight. At a non-fat milk solids content of less than about 4.5% by weight, the milkshake beverage compositions are likely to be thin and lack the consistency of milkshakes, whereas such compositions are likely to be unstable at a non-fat milk solids content greater than about 10% by weight. Because of their non-fat milk solids content, the milkshake beverage compositions of the present invention meet the "real milk" seal claim. That is, they contain more than 50% by weight liquid milk. The liquid milk content can be computed from reconstituted dry milk.

As used herein, the term "non-fat milk solids" refers to the total amount of milk solids (on a dry basis exclusive of milkfat) that are present in the milkshake beverage compositions of the present invention, or in mixtures used in preparing such compositions. Non-fat milk solids include milk protein (e.g. casein), milk sugars (e.g. lactose), minerals and vitamins. The fat and milk-solids content should be determined at the time of preparing the initial batch mixture.

A variety of dairy-based sources can be used to provide non-fat milk solids for the milkshake beverage compositions of the present invention. These dairy-based sources include cream, dry cream, fluid whole milk, concentrated whole milk, evaporated whole milk, sweetened condensed whole milk, superheated condensed whole milk, dried whole milk, skim milk, concentrated skim milk, evaporated skim milk, condensed skim milk, superheated condensed skim milk, sweetened condensed skim milk, sweetened condensed part-skim milk, nonfat dry milk, concentrated skim milk from which a portion of the lactose has been removed, ammonium caseinate, calcium caseinate and sodium caseinate. The dairy-based sources of non-fat milk solids also may provide milkfat that forms a portion of the total milk content present in the milkshake beverage compositions of the present invention.

Particularly preferred dairy-based sources of non-fat milk solids for use in the present invention are condensed skim milk, sweetened condensed whole milk, fluid whole milk, 1% milk, skim milk, nonfat dry milk, cream and mixtures thereof. Preferred non-dairy sources of non-fat milk solids include caseinates of different types.

The starch component used in the present invention may be selected from a fat mimetic type of starch. Preferably, the starch component is a modified food starch, such as N-Lite-L from National Starch. The starch component is present in the final milkshake beverage composition preferably in an amount of from about 2% to about 4% by weight, and more preferably in an amount of from about 2.5% to about 3.0% by weight. If less than 2% by weight of starch is employed, the resulting beverage composition is likely to be thin in consistency, whereas more than 4% by weight of starch is likely to provide a final composition possessing thick consistency but with a starchy taste.

In addition, the starch component suitable for use in the present invention preferably possesses a range in diameter of from about 5 to about 30 microns, with the average diameter preferably being from about 10 to about 20 microns, and more preferably about 15 microns.

The milkshake beverage compositions of the present invention also may include a sugar component. Preferably, the sugar is present in an amount of from about 7% to about 12% by weight, with an amount of from about 8% to about 10% by weight even more preferred, depending on flavor type (e.g., higher for chocolate). Use of sugar in an amount of less than 7% by weight may provide a final beverage composition lacking sweetness, whereas using sugar in amounts exceeding 12% by weight risks high calorie content. The preferred sugar component for use in the present invention is sucrose, both in the liquid and the granular forms. Other types of sugars or mono or dissaccharides with reducing properties will cause discoloration to light color milkshake compositions during retorting.

The milkshake beverage compositions of the present invention additionally may contain heavy cream derived from milk. The heavy cream can be either UHT processed or pasteurized. The heavy cream is preferably present in an amount of from about 1.5% to about 2.5% by weight, with from about 1.8% to about 2.0% even more preferred. The heavy cream provides the final beverage composition with proper stability and mouthfeel. If less than 1.5% by weight heavy cream is employed, the final composition is likely to lack proper mouthfeel, whereas amounts of heavy cream in excess of 2.5% by weight is likely to jeopardize the low fat claim.

The milkshake beverage compositions also may contain disodium phosphate in an amount of from about 0.01% to about 0.05% by weight, and more preferably in an amount of from about 0.02% to about 0.03% by weight. Disodium phosphate improves the heat stability of the final milkshake beverage composition.

A stabilizer also may be included in the milkshake beverage compositions of the present invention. The stabilizer may be selected from those conventional in the art, such as sodium alginate, propylene glycol alginate, gelatin, gum acacia, guar gum, gum karaya, locust bean gum, gum tragacanth, carrageenan and salts thereof, xanthan gum, microcrystalline cellulose, cellulose ethers such as methyl cellulose, hydroxypropyl cellulose, hydroxypropylmethyl cellulose, carboxymethyl cellulose and its sodium salt, as well as mixtures of these stabilizers.

The amount of stabilizer included in the milkshake beverage compositions of the present invention is that typically found in such compositions, e.g., up to about 0.05% by weight, except in the case of microcrystalline cellulose for which the usage level can be as high as 0.5% by weight. More preferably, the stabilizer is present in an amount of from about 0.005% to about 0.04% by weight, and even more preferably in an amount of from about 0.01% to about 0.03% by weight. Amounts lower than 0.005% by weight are likely to provide under-stabilization, whereas amounts in excess of 0.050% by weight can result in over-stabilization.

A preferred stabilizer is carrageenan. The amount of carrageenan in the milkshake beverage can be varied depending on the type of carrageenan used (kappa, lambda, iota). The kappa type of carrageenan is primarily used to form a more rigid gel matrix to suspend cocoa. The lambda type is used to provide viscosity. The iota type can be used to provide a more elastic gel matrix and also viscosity.

The milkshake beverage compositions of the present invention also may contain one or more natural and/or artificial retortable flavorants. Suitable natural flavorings include: citrus and noncitrus fruit flavors (e.g., whole or comminuted fresh fruit, fruit purees, fruit concentrates, extracts or essences, candied or glazed fruits, and dried fruits), and sugar-free versions of such fruit flavorings; flavors derived from botanicals; spices; chocolate, cocoa or chocolate liquor; coffee; flavorings obtained from vanilla beans; nuts, including nutmeats and nut extracts from pecans, walnuts, almonds, pistachios, filberts and peanuts; liqueur flavorants such as alcohol, whiskey and other distilled beverages, fruit brandy distillate and brandy flavor essence, and fruit liqueurs. Suitable artificial flavorants include aromatic chemicals and imitation flavors.

The flavorant used is present preferably in an amount of from about 0.1% to about 1.0% by weight, depending on the type of flavorant (e.g., natural, artificial or blend). In a preferred embodiment, the flavorant is cocoa, and it is present in an amount of from about 0.5% to about 1.0% by weight.

One or more natural and/or artificial colorants also may be added to the compositions of the present invention to obtain desired aesthetic effects. The one or more colorants may be selected from any of the colorants conventional in the art such as caramel color, red #3 and yellow #5. The preferred colorant for a milkshake beverage composition is product dependent. The amount of colorant employed will depend on desired end-product characteristics, but will typically be on the order of from about 0.0005% to about 0.0035% by weight.

The milkshake beverage compositions of the present invention also may include one or more vitamin and/or mineral additives. Suitable vitamin additives include vitamin B2, vitamin B6, vitamin B12, vitamin C (ascorbic acid), niacin, pantothenic acid, biotin, folic acid and vitamins A and D. Suitable minerals include the wide variety of minerals known to be useful in the diet, such as calcium, magnesium, and zinc. Any combinations of vitamins and minerals can be used in the milkshake beverage compositions according to the present invention.

The milkshake beverage compositions of the present invention also may contain one or more additional sweeteners, such as nutritive and non-nutritive (high-intensity, artificial) sweeteners. Suitable nutritive sweeteners include sucrose, glucose, fructose, maltose, corn syrups including high fructose corn syrups, invert sugar, maple syrup, maple sugar, honey, brown sugar, refiners syrup (also known as liquid sugar or liquid sucrose), and mixtures of these sweeteners. The amount of nutritive sweetener included is selected to provide the desired sweetness intensity. However, nutritive sweeteners containing any reducing sugar tend to discolor the product through the maillard reaction.

Suitable retort stable, non-nutritive sweeteners, i.e., non-caloric or reduced calorie sweeteners, include saccharin, sucralose and aspartame and acesulfame-K blends. The particular amount of non-nutritive sweetener included in the milkshake beverage compositions of the present invention depends on the sweetness intensity of the particular sweetener and the sweetness effect desired.

The compositions of the present invention also may contain small amounts of alkaline agents to adjust pH. Such agents include potassium hydroxide, sodium hydroxide and potassium carbonate. For example, the alkaline agent potassium hydroxide is present preferably in an amount of from about 0.02 to about 0.04% by weight, with an amount of about 0.03% more preferred. The amount will depend, of course, on the type of alkaline agents and on the degree to which the pH must be adjusted.

EXAMPLES

The following non-limiting examples illustrate the negative effects that homogenization may have on starch-containing milkshake beverage compositions and how such effects may be avoided.

EXAMPLE 1

Milkshake beverage compositions according to the present invention, having improved stability and thicker consistency, were produced by following the formulation batching and processing conditions (HTST, homogenization and retorting) outlined in Table 1 and discussed below.

TABLE 1

Dairy Based Beverage Formulations

| Ingredient | Vanilla Shake | Chocolate Shake | Strawberry Shake |
|---|---|---|---|
| NFDM (Lo-Heat) | 850 gm | 850 gm | 850 gm |
| Sucrose (Granular) | 800 gm | 800 gm | 800 gm |
| Heavy Cream (App. 40% Fat) | 184 gm | 177 gm | 184 gm |
| Modified Starch (Fat Mimetic Type) | 300 gm | 250 gm | 300 gm |
| Disodium Phosphate | 2.5 gm | 2.5 gm | 2.5 gm |
| Carrageenan (Kappa Type) | 1.65 gm | 0.5 gm | 1.0 gm |
| Cocoa Powder (Natural) | — | 0.75 gm | — |
| Vanilla Flavor (Artificial) | 15 gm | — | — |
| Strawberry Flavor Natural & Artificial | — | — | 30 gm |
| Red #3 Color | — | — | 0.05 gm |
| Water | 7,846.85 gm | 7,919.25 gm | 7,832.45 gm |
| TOTAL | 10,000 gm | 10,000 gm | 10,000 gm |

The processing conditions used for the compositions identified in Table 1 were as follows.

A. Batching

The required amount of heated distilled water (110° F.) was poured into a ten-gallon liquefier. The premixed amounts of sugar, carrageenan and disodium phosphate were then added to the water while agitating. The combination was mixed for three minutes. Low heat NFDM was then added to the mixture, followed by heavy cream, and the combination was mixed for three minutes. The required amount of starch was then mixed in for three minutes. The required amounts of processed cocoa suspension (10% solution in water), which were preprocessed at a temperature of 280° F. for a short time (30 seconds) and kept refrigerated, were added to the mixture, and the mixture was mixed for three minutes. The temperature of the final batch mixture was recorded.

B. HTST Process Using Microthermics And Homogenization

The hot batch, which was at a temperature of approximately 100–110° F., was then poured into a microthermics process unit for HTST treatment. The temperature of the holding tube was maintained at approximately 185° F. The speed of the product moving through the holding tube was regulated to achieve a holding time of 30 seconds.

The HTST processed batch was then run in a single pass through an APV Homogenizer, at a total pressure of 3000 psi (2500/500). The homogenized mixture was collected in a stainless steel vessel, and the resulting hot beverage product was placed in an ice-water bath to cool it to 70° F. The pH was then adjusted to 7.0 using a 10% KOH solution, and the composition produced was filled into 10 oz. retortable glass bottles and capped.

C. Retorting

The capped bottles were then retorted at a rotation speed of 15 rpm and a retort temperature of 122° C. (253° F.). A minimum $F_o$ of 5.0 was obtained. The bottles were then cooled down to 100° F.

EXAMPLE 2

Table 2 illustrates that omitting HTST pasteurization improves both product consistency and stability. To conduct the stress test, the products were stored at oscillating temperatures of 4° C. for 8 hours and 40° C. for 18 hours. Each storage temperature and period represents one cycle. The greater number of cycles represents a more stable product. The viscosity was measured using a Brookfield Digital Viscometer (Model No. LVTDV-11), Spindle No. 34, at an RPM of 60 and a temperature of 4° C.

TABLE 2

Effects Of Processing Conditions On Product Consistency And Stability

| Process | Vanilla Shake | Chocolate Shake | Strawberry Shake |
|---|---|---|---|
| (Viscosity (cps)*) | | | |
| HTST (Control) | 115 | 61 | 84 |
| Omitting HTST | 262 | 192 | 367 |
| (Stability Stress (cycles)) | | | |
| HTST (Control) | 3 Cycles | Cocoa Settling | 3 Cycles |
| Omitting HTST | 10 + Cycles | 10 + Cycles | 10 + Cycles |

EXAMPLE 3

Aliquots of a 7.5% (w/w) modified starch slurry at pH 7.0 and 110° F. were heated and processed under the conditions shown in the left-hand column of Table 3 below. The viscosity data set forth in the right two columns demonstrates that the shearing effect of homogenization is detrimental to swollen starch granules, as shown in samples 3 and 4, which granules typically build viscosity upon heating (HTST or UHT), as shown in samples 2 and 5. However, homogenization has minimal if no negative effect on unheated and non-swollen starch granules, e.g. samples 1 and 5, since their ability to build up viscosity during the high heat steps of retorting or UHT remains largely unaffected. Samples 4 and 5 of Table 3 illustrate that the reverse sequence method of the present invention applies equally well to UHT processes used for aseptic packaging.

TABLE 3

Effects Of Processing Conditions On Viscosity Of A Modified Starch Slurry

| Process | Viscosity (cps) (Before Retort) | Viscosity (cps) (After Retort) |
|---|---|---|
| (1) Homogenization* | 5 | 195 |
| (2) HTST** | 220 | 200 |
| (3) HTST followed by Homogenization | 150 | 156 |
| (4) UHT*** followed by Homogenization | 92 | |
| (5) Homogenization followed by UHT | 181 | |

*3,000 psi: 2500/500 psi first/second Stage
**185° F. for 30 Seconds
***284° F. for 60 Seconds

EXAMPLE 4

Table 4 below demonstrates the effects that the stage at which a pregelatinized starch is added (i.e., prior to or post homogenization) has on product viscosity. The strawberry milkshake beverage composition examined was processed under UHT conditions of 291° F. for 60 seconds. The starch used was a pregelatinized type, and the usage level was the same as in Table 1.

TABLE 4

Effects Of The Stage Of Starch Addition On Product Consistency

| Starch Addition | Viscosity (cps) |
|---|---|
| Prior To Homogenization | 102 |
| Post Homogenization | 149 |

This example illustrates that the consistency of products containing pregelatinized starch is affected by the stage of homogenization, because the starch granules in pregelatinized starch are already swollen. Thus, in order to maintain a higher consistency, the stage at which the starch is added is important, i.e., pregelatinized starch should be added post homogenization.

EXAMPLE 5

Table 5 illustrates the effect that reversing the sequence of homogenization and heat treatment, i.e. pasteurization, has on beverage viscosity and stability,

TABLE 5

Effects Of Homogenization/Pasteurization Sequence

| Chocolate Milkshake | Viscosity (cps) (Heat Prior To Homog.) | Viscosity (cps) (Homog. Prior To Heat) |
|---|---|---|
| (1) High Viscosity | 82 (2 Cycle,* Cocoa Settling) | 176 (6 Cycle, No Settling) |
| (2) Low Viscosity | 65 (2 Cycle, Cocoa Settling) | 88 (4 Cycle, Minor Settling) |

Heat: 170° F. for 30 seconds.
Homog.: 2500/500 PSI (First/Second Stage)
*Storage at oscillating temperatures (4° C. and 40° C.)

Samples 1 and 2 are flavor optimized chocolate shake formulations containing added vanilla extract and having the compositions shown in Table 6 below.

TABLE 6

Chocolate Shake Formulations

| Ingredient | High Viscosity Sample 1 | Low Viscosity Sample 2 |
|---|---|---|
| NFDM (Lo-Heat) | 650 gm | 650 gm |
| Sucrose (Granular) | 950 | 950 |
| Heavy Cream (App. 40% Fat) | 177 | 177 |
| Modified Starch | | |
| Fat Mimetic type | 200 | 200 |
| Viscosity build type | 50 | |
| Disodium Phospahte | 2.5 | 2.5 |
| Carrageenan (Kappa type) | 2.0 | 2.0 |
| Cocoa Powder (Natural) | 0.75 | 0.75 |
| Natural Vanilla Extract | 0.15 | 0.15 |
| Water | 8617.6 | 8667.6 |
| Total | 10,000 | 10,000 |

As shown, Sample 2 is a thin, low viscosity version, whereas Sample 1 is a thick, high viscosity version. Sample 1 is a dual starch system, which employs a first starch for mouth feel and a second starch to build up viscosity.

The results shown in Table 5 illustrate that conducting homogenization prior to pasteurization increases viscosity and stability. A comparison of the results shows that the improvement in viscosity and stability is greater in high viscosity systems.

The processing conditions for the formulations shown in Table 6 were slightly different than the conditions outlined for the formulations of Table 1. Namely, the batching conditions were the same except that the cocoa suspension was heated at 180° F. instead of at 280° F. for a short time (30 seconds); the HTST process was conducted using a bench top water bath with built-in holding tubes to regulate the holding temperature and a pump was used to regulate the speed and holding time; and retorting conditions were similar except that a higher $F_o$ of 7 was obtained.

As will be apparent to those skilled in the art from consideration of the specification and the examples herein, modifications and variations can be made to the present invention without departing from the scope or spirit of the invention. It is thus intended that the specification and examples be considered as exemplary only, with the true scope and spirit of the invention being indicated by the following claims.

What is claimed is:

1. A process for producing a retorted milkshake beverage composition having a pH of from about 6.5 to about 7.0, a viscosity of from about 30 to about 600 centipoise, and a non-fat milk solids content of from about 4.5% to about 10.0% by weight, consisting of, in the listed order, the steps of:

(a) preparing a milkshake batch mixture comprising a milk component and a starch component, wherein said starch component is a modified food starch which is present in an amount of from about 2% to about 4% by weight;

(b) homogenizing the mixture at a pressure of from about 2,000 to about 5,000 psi to form a homogenized mixture;

(c) pasteurizing the homogenized mixture to form a pasteurized, homogenized mixture; and (d) subjecting the pasteurized, homogenized mixture to a retorting treatment, whereby fragmentation of said starch component in said retorted milkshake beverage composition has been minimized.

2. A process for producing a retorted milkshake beverage composition according to claim 1, wherein homogenizing step (b) is carried out at a temperature of from about 100° F. to about 130° F.

3. A process for producing a retorted milkshake beverage composition according to claim 1, wherein pasteurizing step (c) is carried out at a temperature of from about 160° F. to about 180° F. and a pressure of from about 2,000 to about 5,000 psi.

4. A process for producing a retorted milkshake beverage composition according to claim 1, wherein the viscosity of the retorted milkshake beverage composition is from about 50 to about 300 centipoise.

5. A process for producing a retorted milkshake beverage composition according to claim 1, wherein the retorted milkshake beverage composition additionally comprises a sugar content in an amount of from about 7% to about 12% by weight.

6. A process for producing a retorted milkshake beverage composition according to claim 1, wherein the retorted milkshake beverage composition additionally comprises heavy cream in an amount of from about 1.5% to about 2.5% by weight.

7. A process for producing a retorted milkshake beverage composition according to claim 1, wherein the retorted milkshake beverage composition additionally comprises a natural or artificial flavorant, in an amount of from about 0.1% to about 1.0% by weight.

8. A process for producing a retorted milkshake beverage composition according to claim 1, wherein the retorted milkshake beverage composition additionally comprises disodium phosphate in an amount of from about 0.01% to about 0.05% by weight.

9. A process for producing a retorted milkshake beverage composition according to claim 1, wherein the retorted milkshake beverage composition additionally comprises a stabilizer selected from the group of hydrocolloid gums, in an amount of from about 0.005% to about 0.05% by weight.

10. A process for producing a retorted milkshake beverage composition according to claim 9, wherein the stabilizer is carrageenan.

11. A process for producing a retorted milkshake beverage composition according to claim 1, wherein the retorted milkshake beverage composition additionally comprises red #3 or yellow #5 colorant, in an amount of from about 0.0005% to about 0.0035% by weight.

12. A process for producing a retorted milkshake beverage composition according to claim 1, wherein the retorted milkshake beverage composition additionally comprises cocoa in an amount of from about 0.5% to about 1.0% by weight.

13. A retorted milkshake beverage composition produced according to the process set forth in claim 1.

14. A process for producing a retorted milkshake beverage composition having a pH of from about 6.5 to about 7.0, a viscosity of from about 30 to about 600 centipoise, and a non-fat milk solids content of from about 4.5% to about 10.0% by weight, consisting of the steps of:

(a) preparing a milkshake batch mixture comprising a milk component and a starch component, wherein said starch component is a modified food starch which is present in an amount of from about 2% to about 4% by weight;

(b) homogenizing the mixture at a pressure of from about 2,000 to about 5,000 psi to form a homogenized mixture; and (c) subjecting the homogenized mixture to a retorting treatment;

wherein, prior to undergoing homogenization step (b), the granules of the starch component possess a diameter of from about 5 to about 30 microns, and whereby fragmentation of said starch component in said retorted milkshake beverage composition has been minimized.

15. A process for producing a retorted milkshake beverage composition according to claim 14, wherein homogenizing step (b) is carried out a temperature of from about 100° F. to about 120° F.

16. A process for producing a retorted milkshake beverage composition according to claim 14, wherein the viscosity of the milkshake beverage composition is from about 50 to about 300 centipoise.

17. A process for producing a retorted milkshake beverage composition according to claim 14, wherein the milkshake beverage composition additionally comprises a sugar content in an amount of from about 7% to about 10% by weight.

18. A process for producing a retorted milkshake beverage composition according to claim 14, wherein the milkshake beverage composition mixture additionally comprises heavy cream in an amount of from about 1.5% to about 2.5% by weight.

19. A process for producing a retorted milkshake beverage composition according to claim 14, wherein the milkshake beverage composition additionally comprises a natural or artificial flavorant, in an amount of from about 0.1% to about 1.0% by weight.

20. A process for producing a retorted milkshake beverage composition according to claim 14, wherein the milkshake beverage composition additionally comprises disodium phosphate in an amount of from about 0.01% to about 0.05% by weight.

21. A process for producing a retorted milkshake beverage composition according to claim 14, wherein the retorted milkshake beverage composition additionally comprises a stabilizer selected from the group of hydrocolloid gums, in an amount of from about 0.005% to about 0.05% by weight.

22. A process for producing a retorted milkshake beverage composition according to claim 21, wherein the stabilizer is carrageenan.

23. A process for producing a retorted milkshake beverage composition according to claim 14, wherein the milkshake beverage composition additionally comprises red #3 or yellow #5 colorant, in an amount of from about 0.0005% to about 0.0035% by weight.

24. A process for producing a retorted milkshake beverage composition according to claim 14, wherein the mixture additionally comprises cocoa in an amount of from about 0.5% to about 1.0% by weight.

25. A retorted milkshake beverage composition produced according to the process set forth in claim 14.

* * * * *